(12) United States Patent
Ausman et al.

(10) Patent No.: US 7,796,054 B2
(45) Date of Patent: Sep. 14, 2010

(54) AIRCRAFT ELECTRICAL SYSTEM EVALUATION

(75) Inventors: Marc Ausman, Albuquerque, NM (US); Kevin DeVries, Albuquerque, NM (US)

(73) Assignee: Vertical Power, Inc., Albuquerque, NM (US)

( * ) Notice: Subject to any disclaimer, the term of this patent is extended or adjusted under 35 U.S.C. 154(b) by 475 days.

(21) Appl. No.: 11/875,816

(22) Filed: Oct. 19, 2007

(65) Prior Publication Data

US 2008/0036624 A1 Feb. 14, 2008

Related U.S. Application Data

(63) Continuation-in-part of application No. 11/311,060, filed on Dec. 19, 2005.

(60) Provisional application No. 60/853,712, filed on Oct. 23, 2006.

(51) Int. Cl.
G08B 21/00 (2006.01)

(52) U.S. Cl. ............. 340/945; 244/53 R; 702/144

(58) Field of Classification Search ............... 340/945
See application file for complete search history.

(56) References Cited

U.S. PATENT DOCUMENTS

| | | | |
|---|---|---|---|
| 4,127,847 A | 11/1978 | Stifter | |
| 4,191,347 A | 3/1980 | Fueyo | |
| 4,243,970 A | 1/1981 | Hardee et al. | |
| 4,409,635 A | 10/1983 | Kraus | |
| 4,452,207 A | 6/1984 | Moore, Jr. | |
| 4,598,890 A | 7/1986 | Herzog et al. | |
| 4,649,484 A | 3/1987 | Herzog et al. | |
| 4,729,102 A | 3/1988 | Miller | |
| 4,811,255 A * | 3/1989 | Kelly, III | ............ 702/147 |
| 5,001,638 A | 3/1991 | Zimmerman | |
| 5,082,208 A | 1/1992 | Matich | |
| 5,353,657 A | 10/1994 | Bainbridge, III | |
| 5,497,072 A | 3/1996 | LeComte et al. | |
| 5,723,915 A | 3/1998 | Maher et al. | |
| 5,864,221 A | 1/1999 | Downs et al. | |
| 5,913,492 A | 6/1999 | Durandeau et al. | |
| 5,941,222 A | 8/1999 | Braly | |
| 6,325,333 B1 | 12/2001 | Najmabadi et al. | |
| 6,346,892 B1 | 2/2002 | DeMers et al. | |
| 6,556,902 B2 | 4/2003 | Ing et al. | |
| 6,639,522 B2 | 10/2003 | Derderian | |
| 6,664,945 B1 | 12/2003 | Gyde et al. | |

(Continued)

OTHER PUBLICATIONS web pages at http://www.tcwtech.com/, (visited on Jan. 26, 2008 and Jan. 27, 2008).

*Primary Examiner*—Brian A Zimmerman
*Assistant Examiner*—Sara Samson
(74) *Attorney, Agent, or Firm*—V. Gerald Grafe

(57) ABSTRACT

A computer implemented function monitors the position of the magneto switch in an aircraft to provide real-time feedback of engine RPM drop during a magneto (mag) check and communicates whether parameters are within limits. The function can also monitor engine and groundspeed/airspeed data in an aircraft to verify the magneto switch is in the correct position during engine start, takeoff and flight and can provide an alert to the pilot if the switch is not in the correct position. The automated magneto check function provides an easy way to test the operation of the aircraft's engine-driven magnetos and provides additional safety by alerting the pilot to unsafe positioning of the switch.

10 Claims, 4 Drawing Sheets

U.S. PATENT DOCUMENTS

| | | |
|---|---|---|
| 6,700,482 B2 | 3/2004 | Ververs et al. |
| 6,754,567 B2 | 6/2004 | Bernard |
| 6,824,099 B1 | 11/2004 | Jones |
| 6,842,672 B1 | 1/2005 | Straub et al. |
| 6,859,688 B1 | 2/2005 | Orf et al. |
| 7,021,587 B1 | 4/2006 | Younkin |
| 7,039,518 B2 | 5/2006 | Ingram et al. |
| 2002/0035415 A1 | 3/2002 | Gardner |
| 2002/0035416 A1 | 3/2002 | De Leon |
| 2003/0048203 A1 | 3/2003 | Clary |
| 2005/0187677 A1 | 8/2005 | Walker |
| 2010/0076630 A1 | 3/2010 | Vian |

\* cited by examiner

|  | L Mag | L/R | R Mag |
|---|---|---|---|
| Start | 1700 |  | 1720 |
| delta | 110 | -10- | 120 |
| End | 1590 |  | 1600 |

Fig. 4

AIRCRAFT ELECTRICAL SYSTEM EVALUATION

CROSS-REFERENCE TO RELATED APPLICATIONS

This application claims the benefit of U.S. provisional application No. 60/853,712, filed Oct. 23, 2006, which is incorporated herein by reference. This application claims the benefit as a continuation-in-part of U.S. patent application Ser. No. 11/311,060, filed Dec. 19, 2005, which is incorporated herein by reference.

This application is related to the following applications, each of which is incorporated herein by reference:

Aircraft Emergency Handling, U.S. patent application Ser. No. 11/875,813, filed on the same date hereof;

Backup Electrical Power System for Solid-State Aircraft Power Distribution Systems, U.S. patent application Ser. No. 11/875,815, filed on the same date hereof;

Aircraft Exhaust Gas Temperature Monitor, U.S. patent application Ser. No. 11/875,818, filed on the same date hereof;

Variable Speed Flap Retraction and Notification, U.S. patent application Ser. No. 11/875,819, filed on the same date hereof.

FIELD OF THE INVENTION

This invention relates to the field of aircraft control, and more specifically to systems that provide for evaluation of aircraft electrical systems.

BACKGROUND

The present invention relates to avionics. Modern commercial/private aircraft, as well as older aircraft, generally include a myriad of instrumentation panels associated with electronic devices having controls, displays, and software applications, which are used to present information to pilots and/or copilots during flight. The electronic devices, controls, displays and applications are interfaced together to form avionics equipment within the aircraft. Pilots (where "pilot" includes copilots and any other controller of the aircraft) access one or more interface devices of the avionics equipment prior to and during the flight. Some of this information presented monitors the status of equipment on the aircraft, while other switches and knobs are used to control functions of the aircraft such as throttles (engine speed), switches (lights, radios, etc), levers (landing gear and flaps), and controls for navigation, for example.

Pilots currently manually check for the proper operation of the magnetos on a piston-powered aircraft. An aircraft typically has two magnetos for redundancy, referred to as the left magneto and the right magneto. The magneto generates the spark which ignites the fuel in the combustion chamber. To check for proper operation of the magnetos, the pilot performs a "run up" where the RPM of the engine is increased to something slightly below normal cruise RPM while the pilot holds the brakes. A run up is usually performed while the aircraft is on the ground and prior to takeoff.

During the run up, the pilot disables one of the magnetos to check the proper operation of the other magneto. To do this, the pilot typically uses a four-position rotary switch labeled: Off-R-L-Both. The Off position disables both magnetos, e.g., by shorting the spark-generating circuit so that the magneto cannot generate a spark. The L position enables the left magneto by shorting only the right magneto. The R position enables the right magneto by shorting only the left magneto. The Both position enables both magnetos to operate and does not short either of the magnetos. The Both position is used for normal operation.

When a magneto is shorted, the RPM of the engine drops because the engine is only running on one magneto. The current method for checking the magnetos is to run the engine with the switch in the Both position and increase the engine RPM to a value approximately between cruise and idle. When the engine RPM has stabilized, the pilot moves the switch to the R position and watches the RPM drop on the tachometer. The pilot then moves the switch back to the both position and waits for the RPM to rise and stabilize. The pilot then moves the switch to the L position and again watches the RPM drop. In order to pass the magneto check, the RPM drop for each test, as well as the difference between the RPM drop for each side must be within the specifications published by the engine manufacturer.

Because the engine will run with only one magneto operating, it is possible for pilots to unintentionally leave the switch in either the L or R position during engine start, takeoff and flight. This is unsafe because if the operating magneto fails, the other magneto is not operating because it is shorted. Such a situation causes a complete engine failure.

Other U.S. patents of interest relative to this disclosure include the following, each of which is incorporated herein by reference: U.S. Pat. No. 4,127,847 "Monitoring system for aircraft master switch"; U.S. Pat. No. 4,243,970 "Open circuit alarm"; and U.S. Pat. No. 5,353,657 "Airplane engine starter system and housing".

Accordingly, there is a need for methods and systems that facilitate evaluation of magneto operation while reducing pilot workload and potential for error.

SUMMARY OF THE INVENTION

The present invention can provide a computer implemented function that monitors the position of a magneto switch in an aircraft to provide real-time feedback of engine RPM drop during a magneto check and communicates whether parameters are within limits. The function can also monitor engine and groundspeed/airspeed data in an aircraft to verify the magneto switch is in the correct position during engine start, takeoff and flight and can provide an alert to the pilot if the switch is not in the correct position. The automated magneto check function provides an easy way to test the operation of the aircraft's engine-driven magnetos and provides additional safety by alerting the pilot to unsafe positioning of the switch.

The present invention provides methods and apparatuses for automatically reading the RPM drop during a magneto check and verifying it against predetermined limits. Further, the invention can communicate to the pilot (e.g., using audio or visual cues) if the magneto switch is left in a wrong and possibly dangerous position during takeoff or flight. Information associated with the present invention can be communicated to the pilot by, for example, display on a graphic display screen such as a liquid crystal display. A computer can implement a function that allows it to monitor the position of the magneto switch. The computer can also monitor other information such as engine data and GPS data to determine if the aircraft is on the ground or in the air.

BRIEF DESCRIPTION OF THE FIGURES

FIG. 4 is a schematic illustration of an example display produced by an example embodiment of the present invention.

DETAILED DESCRIPTION OF THE INVENTION

Figure 1:
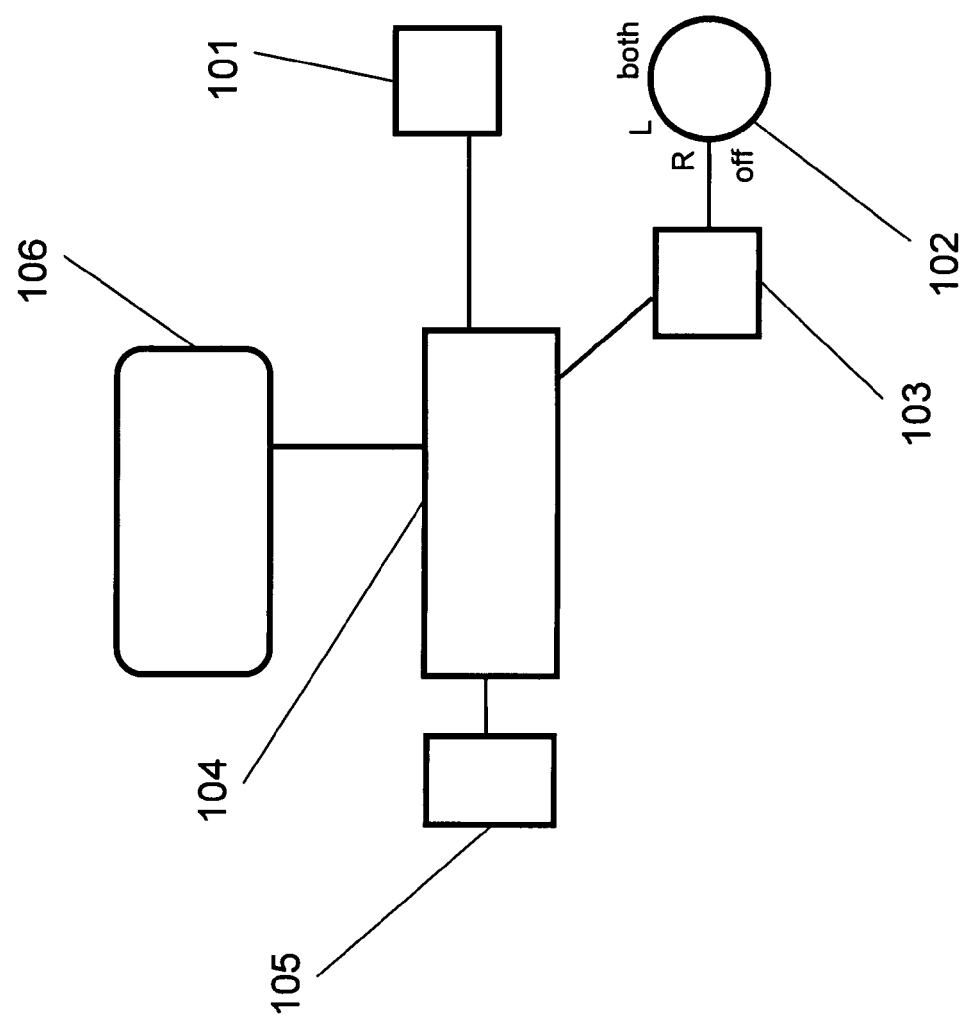
FIG. 1 is a schematic illustration of an example embodiment of the present invention.

FIG. 1 is a schematic illustration of an example embodiment of the present invention. A sensor 101 is adapted to sense the operation rate of the engine, for example by sensing revolutions per minute or power output of the engine. A switch 102 is adapted to control the operation of two (or more) magnetos, for example by selectively shorting each magneto, or otherwise individually enabling each magneto to affect the operation of the engine. A sensor 103 senses the position of the switch 102 and communicates a signal representative of the position to a controller 104. Note that the sensor 103 can sense the switch 102 position directly, or indirectly, as an example by sensing the output of each magneto to discern whether the magneto is contributing to the operation of the engine. The controller 104 can control a memory device 105 and store in the memory device 104 information relating to the engine operation corresponding to operation with an individual magneto. The controller 104 can communicate with a pilot, for example with a communication system 106 comprising a display, audible signals, or other communication channels.

A pilot can indicate that a magneto check is to performed, for example by supplying a voice command or engaging a switch or "soft" button on a touch-sensitive display. The pilot can increase the engine operation with the switch 102 in the "both" position. The controller 104 accepts one or more indications of the engine operation rate from the sensor 101, for example by taking a single sample, or by combining multiple samples, and storing the indications in the memory device. The pilot can then manipulate the switch 102 to disable a first of the two magnetos. The controller 104 can determine the position of the switch 102 by accepting an input from sensor 103, and accept one or more indications of the engine operation rate from the sensor 101, for example by taking a single sample, or by combining multiple samples, and storing the indications in the memory device. The pilot can then manipulate the switch 102 to disable the first magneto and enable the second magneto. The controller 104 can determine the position of the switch 102 by accepting an input from sensor 103, and accept one or more indications of the engine operation rate from the sensor 101, for example by taking a single sample, or by combining multiple samples, and storing the indications in the memory device. The controller 102 can then communicate to the pilot a representation of the effect on the engine operation of the individual magnetos. For example, the controller 102 can display to the pilot the engine RPM under each of the three magneto conditions (both, left only, and right only). The controller 102 can also, or alternatively, display an indication of the relative performance such as the differences among the rates, the proportion of the rates, or the compliance of the rates with predetermined limits.

If the controller 102 also has access to information that indicates whether the aircraft is in a normal operating mode (i.e., a mode that is not suitable for magneto check such as in flight), then the controller 102 can provide an alert if the switch 102 is not in the "both" position while the aircraft is in a normal operating mode.

Figure 2:
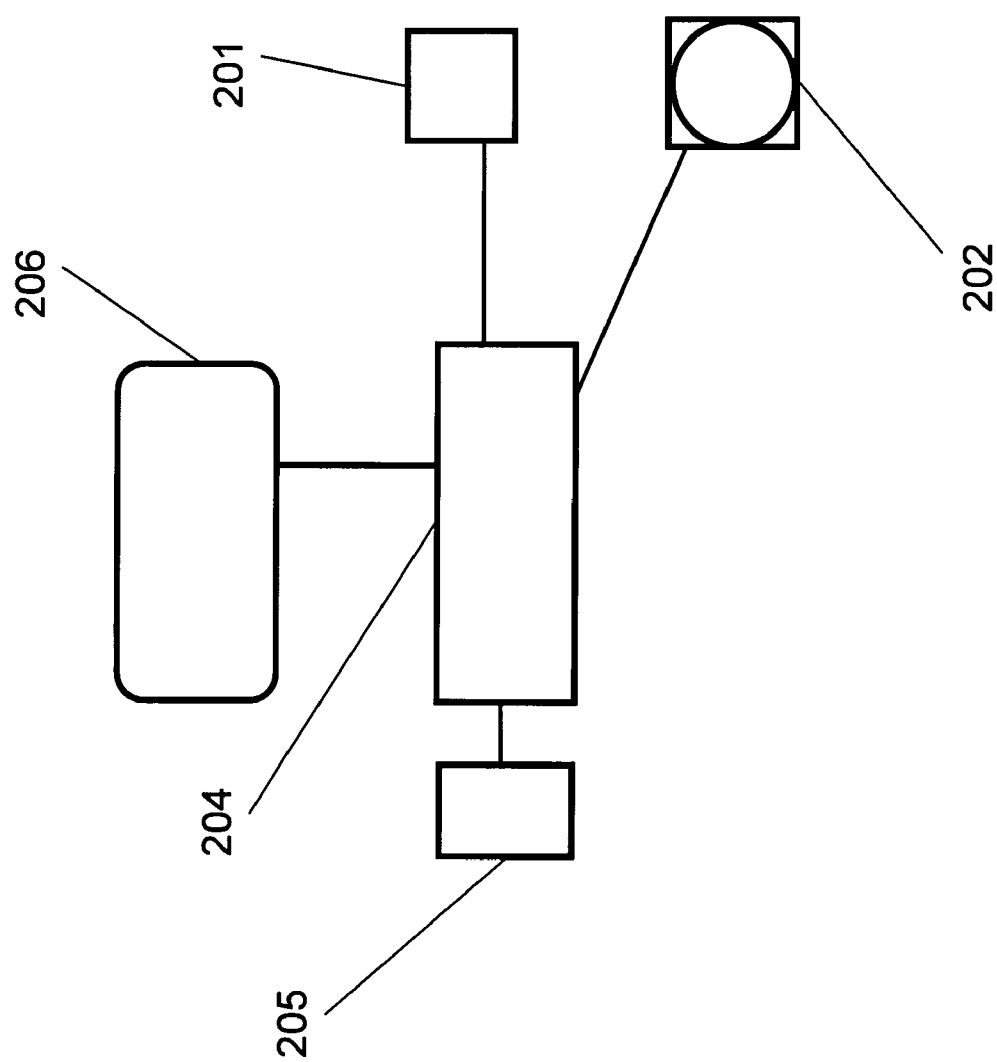
FIG. 2 is a schematic illustration of an example embodiment of the present invention.

FIG. 2 is a schematic illustration of an example embodiment of the present invention. An engine operation rate sensor 201 can report information concerning the operation of the engine to a controller 204. The controller 204 can store information in a memory device 205, and can communicate with a pilot using an input/output system 206 such as a touch-sensitive display. The controller 204 can control a switch 202 to selectively enable either or both of two magnetos (or more, if present in the system). A pilot can indicate that a magneto check is desired, for example by pressing a soft button on the touch sensitive display, or by engaging a pre-flight mode of operation that includes a magneto check. The controller 204 can control the switch 202 to enable both magnetos, and record the engine operation rate reported by the sensor 201. The controller 204 can then disable each magneto in turn, and record the corresponding engine operation rate. The controller 204 can then report the result of the magneto check, for example by displaying to the pilot the engine rates in each condition, by displaying an indication that the engine operation rates were within predetermined limits, or by simply displaying an error if the engine operation rates were not within predetermined limits.

Figure 3:
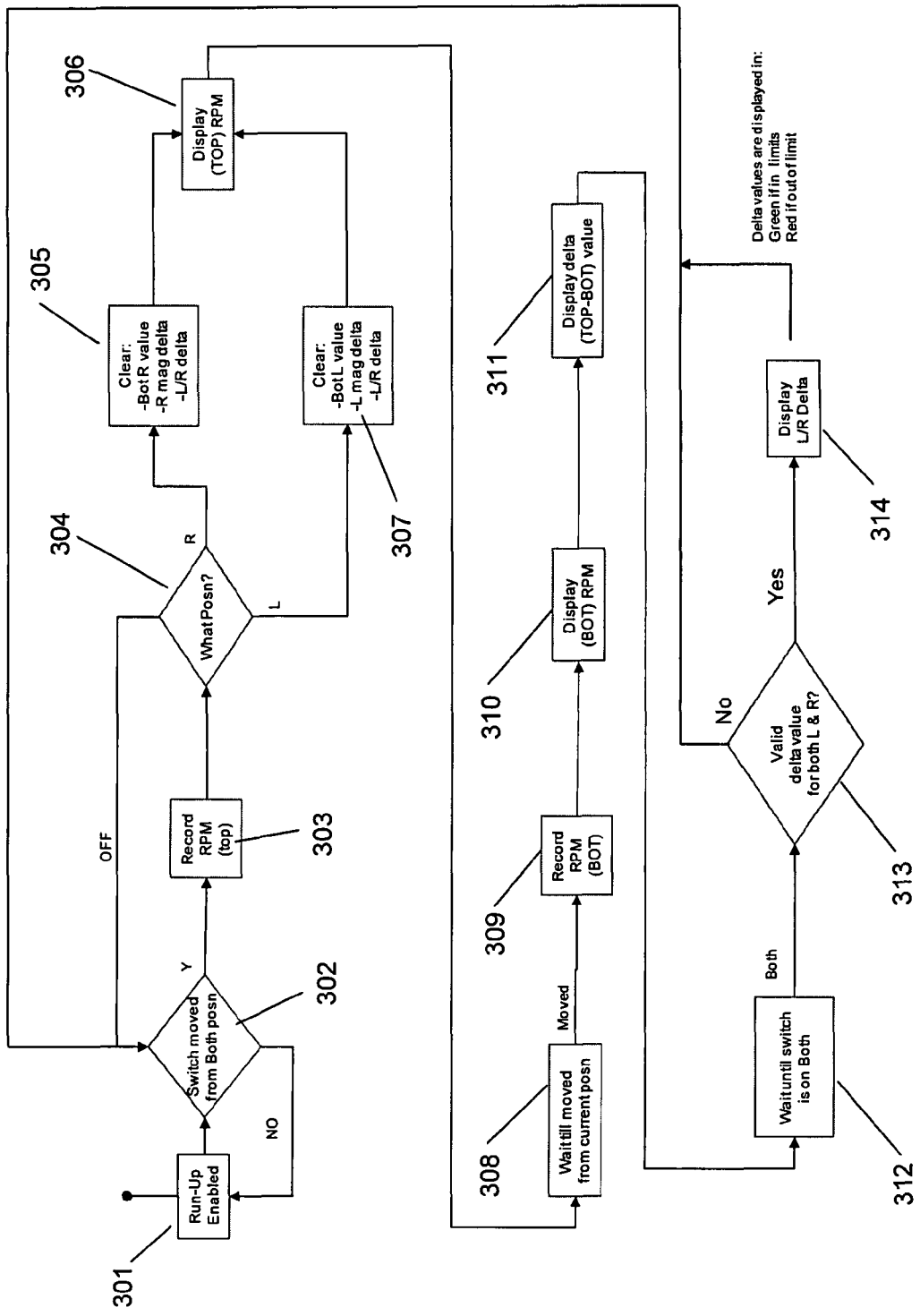
FIG. 3 is a flow diagram of an example embodiment of the present invention.

FIG. 3 is a flow diagram of an example method according to the present invention, for example of a method that can be implemented in computer software in a controller such as those described before. Once the system receives a signal that a run-up 301 is being performed (e.g., from a pilot input, sensor inputs, or a combination), it monitors the position of the magneto switch. When the switch is moved from the Both position 302, the RPM (for convenience, referred to herein as the Top RPM, as it represents the higher RPM value) is recorded 303. The switch position can be monitored to determine which magneto is now enabled 304. If the right magneto is enabled, then the RPM value corresponding to the right magneto can be cleared, as well as the change from the Top RPM when enabling only the right magneto ("R mag delta") and the difference between the RPM with only the right magneto enabled and the RPM with only the left magneto enabled ("L/R Delta"). If the left magneto is enabled, then the RPM value corresponding to the left magneto can be cleared, as well as the change from the Top RPM when enabling only the left magneto ("L mag delta") and the difference between the RPM with only the right magneto enabled and the RPM with only the left magneto enabled ("L/R Delta").

The RPM with both magnetos can be displayed 306. The switch can then be monitored, and when it is moved 308 then the RPM recorded 309 as the lower RPM recorded 309 ("Bot R" or "Bot L", depending on which magneto was enabled), displayed 310, and compared with the TOP RPM 311 and the result displayed 311. When the switch is returned to the "both" setting 312, then, if both left and right magnetos have been individually enabled 313, the differences between the Bot R and Bot L RPM values can be determined and displayed 314.

FIG. 4 is an illustration of an example display suitable for use with the method of FIG. 3. Representative numbers are shown in the figure for reference and discussion; in operation the numbers would be as determined from the sensor information. The left magneto check information is represented in the display by the starting RPM (1700, the engine RPM just before disabling the right magneto) and the ending RPM (1590, the engine RPM just before re-enabling the right magneto). The drop in RPM when operating on just the left magneto (110) is also displayed. The right magneto check information is represented in the display by the starting RPM (1720, the engine RPM just before disabling the left magneto) and the ending RPM (1600, the engine RPM just before re-enabling the left magneto). The drop in RPM when operating on just the right magneto (110) is also displayed. The difference between the drop in RPM on the left magneto the right magneto is also displayed (10). The pilot can thus readily determine the relative performance of the two magnetos, and whether the effect on engine performance of disabling either magneto is acceptable. The relationship of reported results to predetermined limits can be communicated, for example by displaying out-of-limit values in a contrasting color (e.g., in-limit results in green, out-of limit results in red), in a different font or display mode (e.g., bold or flashing if out-of-limit), or by audible or visible alerts (e.g., "left magneto out of range" displayed or spoken).

Separate from the magneto check, it can be important to know that the magneto switch is in the proper position during engine start and flight. The position of the magneto switch can be monitored in several ways. As examples:
1. an additional pole on the switch can be used solely for providing switch position, and the position can thereby be read by the system.
2. the system can detect that a magneto lead is grounded on an existing pole, and then through logic, determine the position of the switch. If no magneto lead is grounded, then the switch is determined to be in Both position. If left magneto lead is grounded, the position is determined to be in R. If right magneto lead is grounded, the position is determined to be in L. If both left and right magneto leads are grounded, the position is determined to be in Off.

If the system determines that the aircraft is in flight by reading the groundspeed (typically input from the GPS) or the airspeed (typically input from an air data computer) is greater than 30 kts, and the magneto switch is not in the Both position, then the pilot can be alerted by an audio and/or visual notification.

The particular sizes and equipment discussed above are cited merely to illustrate particular embodiments of the invention. It is contemplated that the use of the invention can involve components having different sizes and characteristics. It is intended that the scope of the invention be defined by the claims appended hereto.

We claimed:

1. A magneto characterization system for an aircraft having first and second magnetos, comprising:
   (a) an engine operation rate sensor;
   (b) a memory device adapted to store a signal responsive to the engine operation rate sensor;
   (c) a user-controllable switch mounted with the first and second magnetos such that the switch can enable the first magneto only, the second magneto only, or both the first magneto and the second magneto, or disable both magnetos;
   (d) a switch sensor adapted to generate a signal indicative of the position of the user-controllable switch; and
   (e) a controller responsive to the switch sensor and the engine operation rate sensor, adapted to store in the memory device a signal indicative of the engine operation rate sensor output while the switch sensor indicates that one of the first and second magnetos is enabled, and to communicate to a pilot a relationship between (i) the engine operation rate sensor output while the switch sensor indicates that the other magneto is enabled and (ii) the stored signal.

2. A system as in claim 1, further comprising a display, and wherein the controller is adapted to display the relationship to a pilot.

3. A system as in claim 1, wherein the controller receives signals from one or more aircraft systems sufficient to allow the controller to determine whether the aircraft is operating in a condition wherein operating with only one magneto enabled is not preferred, and, if the aircraft is in such a condition and the switch sensor indicates that only one magneto is enabled, then communicating an alert to a pilot.

4. A system as in claim 2, wherein the controller displays the engine operation rate sensor output corresponding to the stored signal and an indication of which magneto was enabled.

5. A system as in claim 4, wherein the controller further displays the engine operation rate sensor output while the other magneto is enabled and an indication of which magneto was enabled.

6. A system as in claim 1, wherein the controller is adapted to determine a ratio of or difference between the engine operation rate sensor outputs produced while each magneto is enabled, and to communicate that ratio or difference to a pilot.

7. A system as in claim 6, wherein the controller communicates an alert to a pilot if the ratio or difference not within a predetermined range.

8. A method of determining whether two magnetos in an aircraft are both operating acceptably, comprising:
   (a) providing a system as in claim 1;
   (b) accepting an indication from a pilot that a magneto check is to be performed;
   (c) when an indication is received from the switch sensor that only one magneto is enabled, then receiving a signal from the engine operation rate sensor and storing a value indicative of the engine operate rate;
   (d) when an indication is received from the switch sensor that the magneto in step c is disabled and the other magneto is enabled, then receiving a signal from the engine operation rate sensor and storing a value indicative of the engine operation rate; and
   (e) communicating to the pilot a relationship between the two stored values.

9. A method as in claim 8, wherein communicating a relationship comprises displaying a ratio of or difference between the two stored values.

10. A method as in claim 8, wherein communicating a relationship comprises displaying a representation of the engine operation rate sensor output correlated to an indication of the magneto enabled while that output was received.

* * * * *